US005164601A

United States Patent [19]

Nordström

[11] Patent Number: 5,164,601

[45] Date of Patent: Nov. 17, 1992

[54] METHOD AND APPARATUS FOR DETECTING MARKS ON A PAPER WEB, USING ALTERNATE SET POINT VALUES INDICATIVE OF LIGHT INTENSITY TO IDENTIFY MARKS AND NON-MARKS

[75] Inventor: Carl Nordström, Uppsala, Sweden

[73] Assignee: Esselte Security Systems AB, Stockholm, Sweden

[21] Appl. No.: 623,975

[22] PCT Filed: Jun. 22, 1989

[86] PCT No.: PCT/SE89/00361

§ 371 Date: Dec. 18, 1990

§ 102(e) Date: Dec. 18, 1990

[87] PCT Pub. No.: WO89/12869

PCT Pub. Date: Dec. 28, 1989

[30] Foreign Application Priority Data

Jun. 22, 1988 [SE] Sweden ............................... 8802357

[51] Int. Cl.[5] ............................................ G06K 5/00

[52] U.S. Cl. .................................. 250/556; 235/455

[58] Field of Search ....................... 250/556, 555, 566; 382/52, 53; 235/455, 460, 470, 471, 472; 356/71

[56] References Cited

U.S. PATENT DOCUMENTS 3,701,099 10/1972 Hall et al. ................. 340/146.3 AG
4,234,867 11/1980 Butin ........................ 340/146.3 AG
4,234,895 11/1980 Sommer et al. ..................... 358/282
4,468,704 8/1984 Stoffel ................................ 358/282
4,520,505 5/1985 Yamamoto et al. .................. 382/52
4,724,307 2/1988 Dutton et al. ........................ 235/455
5,073,700 12/1991 D'Onofrio ........................... 235/455

*Primary Examiner*—David C. Nelms
*Assistant Examiner*—Que T. Le
*Attorney, Agent, or Firm*—Nies, Kurz, Bergert & Tamburro

[57] ABSTRACT

Method for detecting marks (3) present on a paper web (1), which consists of successively producing and preferably recording light-intensity data in the form of intensity indications, using two alternate set-point values of light intensity representative of the presence of a mark or a non-mark. The method uses a process, deciding whether a certain light-intensity indication (V(new)j), shall be attributed to a mark, by selecting as a set-point value (V(old)j), one of the two alternate set points, either the nearest preceding indication (V(old)j) which has been adjudged as indicative of a non-mark and which essentially indicates light background of the paper web (1), or a preceding indication (V(old)j) which has been adjudged as indicative of a non-mark and which has been subjected to an intensity reduction of pre-determined magnitude (UP). There is also an apparatus for carrying out the method.

14 Claims, 5 Drawing Sheets

Fig. 4

Black V (new) j Instantnous value White

V (old) j Desired value

```
   1 3 5 7 911131517192123252729313335373 9
 ;0 2 4 6 810121416182022242628303234363840
 0;2333333333111111111111111111111111111111111111111111111111111111
 1;2333333333111111111111111111111111111111111111111111111111111111
 2;2233333333111111111111111111111111111111111111111111111111111111
 3;2223333333111111111111111111111111111111111111111111111111111111
 4;2222333333111111111111111111111111111111111111111111111111111111
 5;2222233333111111111111111111111111111111111111111111111111111111
 6;2222223333111111111111111111111111111111111111111111111111111111
 7;2222222333111111111111111111111111111111111111111111111111111111
 8;2222222233111111111111111111111111111111111111111111111111111111
 9;2222222233111111111111111111111111111111111111111111111111111111
10;2222222223111111111111111111111111111111111111111111111111111111
11;2222222222111111111111111111111111111111111111111111111111111111
12;2222222222011111111111111111111111111111111111111111111111111111
13;2222222222001111111111111111111111111111111111111111111111111111
14;2222222222200111111111111111111111111111111111111111111111111111
15;2222222222220011111111111111111111111111111111111111111111111111
16;2222222222220001111111111111111111111111111111111111111111111111
17;2222222222222001111111111111111111111111111111111111111111111111
18;2222222222222200111111111111111111111111111111111111111111111111
19;2222222222222220011111111111111111111111111111111111111111111111
20;2222222222222220001111111111111111111111111111111111111111111111
21;2222222222222222000111111111111111111111111111111111111111111111
22;2222222222222222200011111111111111111111111111111111111111111111
23;2222222222222222220001111111111111111111111111111111111111111111
24;2222222222222222220000111111111111111111111111111111111111111111
25;2222222222222222222000011111111111111111111111111111111111111111
26;2222222222222222222200011111111111111111111111111111111111111111
27;2222222222222222222220001111111111111111111111111111111111111111
28;2222222222222222222220000111111111111111111111111111111111111111
29;2222222222222222222222000011111111111111111111111111111111111111
30;2222222222222222222222200001111111111111111111111111111111111111
31;2222222222222222222222220000111111111111111111111111111111111111
32;2222222222222222222222220000011111111111111111111111111111111111
33;2222222222222222222222222000001111111111111111111111111111111111
34;2222222222222222222222222200001111111111111111111111111111111111
35;2222222222222222222222222220000111111111111111111111111111111111
36;2222222222222222222222222220000011111111111111111111111111111111
37;2222222222222222222222222222000001111111111111111111111111111111
38;2222222222222222222222222222200000111111111111111111111111111111
39;2222222222222222222222222222220000011111111111111111111111111111
40;2222222222222222222222222222220000001111111111111111111111111111
  ;2222222222222222222222222222222000000111111111111111111111111111
  ;2222222222222222222222222222222200000111111111111111111111111111
  ;2222222222222222222222222222222220000011111111111111111111111111
  ;2222222222222222222222222222222220000001111111111111111111111111
  ;2222222222222222222222222222222222000000111111111111111111111111
  ;2222222222222222222222222222222222200000011111111111111111111111
  ;2222222222222222222222222222222222220000001111111111111111111111
  ;2222222222222222222222222222222222220000000111111111111111111111
  ;2222222222222222222222222222222222222000000011111111111111111111
  ;2222222222222222222222222222222222222200000001111111111111111111
  ;2222222222222222222222222222222222222220000001111111111111111111
  ;2222222222222222222222222222222222222220000000111111111111111111
  ;2222222222222222222222222222222222222222000000011111111111111111
  ;2222222222222222222222222222222222222222200000001111111111111111
  ;2222222222222222222222222222222222222222220000000111111111111111
  ;2222222222222222222222222222222222222222220000000011111111111111
  ;2222222222222222222222222222222222222222222000000001111111111111
  ;2222222222222222222222222222222222222222222200000001111111111111
  ;2222222222222222222222222222222222222222222220000000111111111111
  ;2222222222222222222222222222222222222222222220000000011111111111
  ;2222222222222222222222222222222222222222222222000000001111111111
```

White

METHOD AND APPARATUS FOR DETECTING MARKS ON A PAPER WEB, USING ALTERNATE SET POINT VALUES INDICATIVE OF LIGHT INTENSITY TO IDENTIFY MARKS AND NON-MARKS

The present invention relates to a method for detecting marks or like indications on a paper web, such as marks that have been applied manually to a coupon, and including the steps of transmitting images of the paper web to optoelectronic conversion elements located in a detecting plane or the like and operative to produce video signals which corresponds to the intensity of the light detected by a respective conversion element and emanating from an area of the paper web scanned by said element; scanning the paper web successively while successively producing and preferably recording light-intensity data; attributing light-intensity data either to the presence of a mark or to a non-mark or the like on the basis of comparison with pre-determined light-intensity values; and compiling the thus classified light-intensity data into a comprehensive image of marks present on the paper web.

The invention also relates to apparatus for carrying out the method.

BACKGROUND OF THE INVENTION

Such methods are used, for instance, for checking betting forms, e.g. pools coupons, for the purpose of reading marks entered manually on the coupons and for the purpose of reading information printed on said coupons in the form of mark locations, coupon identifying data, and like information. Such coupons are normally produced from low-quality paper.

It is highly imperative that such coupons can be read reliably, not least in the case of betting forms. It is also desirable to utilize high detection or sensing sensitivity.

However, many factors influence the detection result and create problems, inter alia in the interpretation of the measurements values obtained. For example, among other things the short beam path will result in uneven imaging, i.e. when reading a smooth, white document the output signal corresponding to lamp intensity will vary considerably at different parts of the arrays or rows of elements present. This irregularity is caused by several factors, of which the following are mentioned by way of example: Different elements in the rows will have different sensitivity to light; lamp defects caused by powder distribution within the lamp will also influence the result; the short beam path and problems associated with wide-angle lenses of scanning optics are also contributory factors. Furthermore, the colour distribution and luminensce of a lamp will change with temperature and age. Further variations occur with variations resulting from the influence of temperature on electronic components, primarily on the rows of conversion elements. Variations will also occur in dependence on the constructional tolerances of the analogue components present. It must be possible to detect marks reliably and effectively, in spite of all the component-based variations that may occur.

As with all detection systems of the kind referred to here, there is found a point at which an increase in sensitivity will result in erroneous detection, due to noise occurring in the signals and in the system as a whole. One example of such problem-creating phenomena is manifested in the fact that the whiteness of the paper, the gray scale, is uneven with each individual coupon and varies from coupon to coupon, and that the marks are not totally black, but that the gray scale of the marks will vary within each individual mark and also possibly between different marks. The present system is particularly intended for detecting hand-made or printed marks on standard white paper, and where noise in the measuring signals is caused, inter alia, by the aforesaid variations.

It is known in the prior art that the presence of a mark can be established by applying a light-intensity set-point value, such that light-intensity below a given level will indicate the presence of a mark. This method places great limitations on suitable sensitivities and has a poor reliability. Some improvement can be made, by using set-point values which constitute the mean values of measurement values obtained from earlier measuring points.

SUMMARY OF THE INVENTION

The present invention relates to a method and apparatus which enable marks to be detected with a high degree of reliability, while automatically taking into account variations resulting from paper quality, light sources, the presence of marks, etc.

Accordingly, the present invention relates to an improvement in a method for detecting marks which are present on a paper web, such as marks which have been applied manually to betting coupons, including the steps of transmitting an image of the paper web to optoelectronic conversion elements located in a detecting plane and producing video signals which correspond to the intensity of the light, detected by respective conversion elements, emanating from an area of the paper web scanned by the elements; scanning the paper web successively while successively producing, and preferably recording, light-intensity data in the form of intensity indications; attributing light-intensity data either to the presence of a mark or to a non-mark on the basis of a comparison made with pre-determined light-intensity, set-point values; attributing a mark to the light-intensity indication when said indication is smaller than the prevailing set-point value by more than a pre-determined extent; and compiling from the thus classified light-intensity data a comprehensive image of marks present on the paper web, the improved method including the aspects that when deciding whether a certain light-intensity indication shall be attributed to a mark there is used one of two kinds of indications as a set-point value (V(old)j), the first kind being the nearest preceding indication (V(old)j), in case the indication has been adjudged as indicative of a non-mark and essentially indicates light background of the paper web (1), and the second kind being a preceding indication (V(old)j), which has been adjudged as indicative of a non-mark and has been subjected to an intensity reduction of pre-determined magnitude (UP), respectively.

The invention also relates to apparatus for detecting marks present on a paper web, for example marks applied manually to a betting coupon, including components for transferring an image of the paper web to optoelectronic conversion elements located in a detecting plane and operative to produce video signals which corresponds to the intensity of the light detected by a respective conversion element and emanating from an area of the paper web as it is scanned by each of the respective elements, so that scanning of the paper web is carried out successively by successively producing and desirably recording light-intensity data in the form of light-intensity indications, and further including apparatus for comparing the light-intensity indications with predetermined intensity values, which are set-point values, and components for attributing light-intensity data either to a mark or to a non-mark or the like on the basis of the comparison, and including devices operative to attribute a mark to the light-intensity indication (V(new)j) when said indication falls below a prevailing set-point value (V(old)j) by a pre-determined extent (MK); and devices for compiling the thus classified light-intensity data such as to form a comprehensive image of the subjects of the scan, such devices including means for selecting intensity-data set-point values (V(old)j) such that when deciding whether a certain light-intensity indication (V(new)j) shall be attributed as indicative of a mark or a non-mark there is used one of two kinds of indications as a set-point value, the first being the nearest preceding indication, in case the indication has been adjudged as indicative of a non-mark and, essentially concerns background light on the paper web (1), and the second being a preceding indication, which has been adjudged as indicative of a non-mark and has been subjected to intensity decrease (UP) of a pre-determined magnitude, respectively.

BRIEF DESCRIPTION OF THE DRAWING

The invention will now be described in more detail with reference to an exemplifying embodiment thereof and also with reference to the accompanying drawings, in which

FIG. 4 illustrates schematically a decision matrix for the selection of set-point values;

DESCRIPTION OF THE PREFERRED EMBODIMENT

Figure 1:
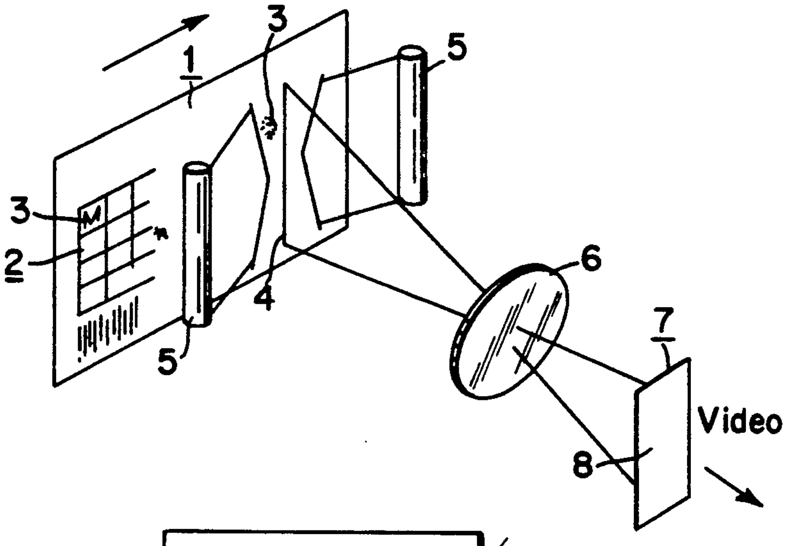
FIG. 1 is a schematic perspective view showing the principle construction of one embodiment of the invention.

FIG. 1 illustrates a paper web 1 which in the illustrated embodiment has the form of a pools coupon or like document, comprising a printed pattern of squares 2 forming a field 2 in which marks 3 are entered manually, said coupon and the marks entered thereon being read mechanically. The paper web 1 is fed through a detecting station 4, with the aid of suitable feed device (not shown), as illustrated in FIG. 1.

The paper web 1 is illuminated in the detecting station 4, by means of at least one lamp 5 of the fluorescent kind provided with a special mixture of daylight red and blue powder. A lens or lens system 6 is operative to focus an image of the paper web onto optoelectronic devices 8, such as an optic array 8, positioned in a detection plane 7 or the like. If desirable for reasons of space for example, the beam path can be deflected with the use of one or more mirrors, not shown. Colour filters are used to separate information detected by the optoelectronic devices 8. The devices 8 are receptive, responsive to both red and blue light. However, when using a blue filter, red and black marks will appear dark, whereas when using a red filter, blue, green and black marks will show dark.

According to one embodiment, the array of optoelectronic devices 8 consist of a so-called photoarray 8 which includes 1024 elements. More generally, the array 8, or devices 8, is/are intended to scan one information line at a time, therewith enabling an image to be compiled as the paper web, i.e. the coupon, passes through the detecting station 4. The thus compiled image is interpreted by the software of said devices.

Figure 2A:
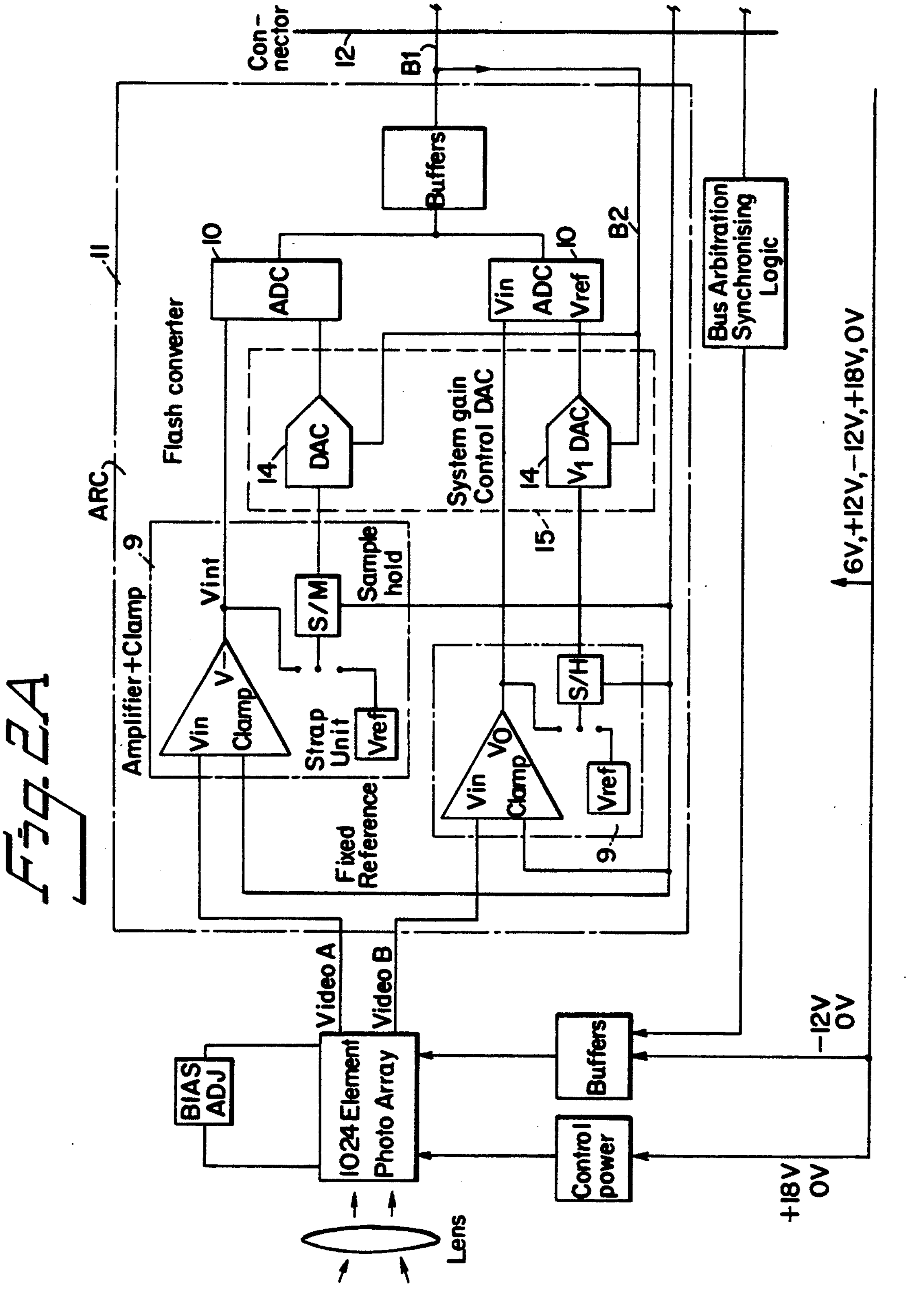
FIGS. 2A and 2B, viewed together and referred to as FIG. 2 is a block schematic of an inventive system.

The array 8 is thus intended to detect a focused image of the coupon or like document and is constructed to convert an optical signal into two electric signals VIDEO A, VIDEO B, (FIG. 2A) which represent the light intensity and which are produced in the form of a data flow, where each element is represented by an analogue voltage. The value of the signal is thus corresponded by the intensity of the reflected light from the scanned coupon or document falling on respective parts of the array. The signals VIDEO A, VIDEO B are amplified separately and freed from any d.c. components in two separate amplifying and holding circuits 9. Signals which are thus amplified and freed from every d.c. component are converted with the aid of separate analogue/digital converters 10, ADC 10, suitably of the high-speed converter type.

The digital output signal from each ADC is given a multiplex form, and comprises a six-bit digitalized data current corresponding to the measured light intensity of the focused image on said array.

The digitalized data-current, here produced by a unit ARC 11 designated an array card 11, is transmitted to a unit called an array-control card 13, ACC 13 (FIG. 2B), for instance via a 34-path connector 12. The connector 12 is restricted in size and all signal lines have dual functions. Thus, a six-bit bus B1 which normally carries the digitalized image information will also function to transmit the values on bus B2 to a digital/analogue converter 14, DAC 14, of an amplification control 15 included in the system. The digitalized data current is transferred to a synthesisor 16 and to a logic unit 19, for mark detection and filtration, among other things.

Figure 2B:
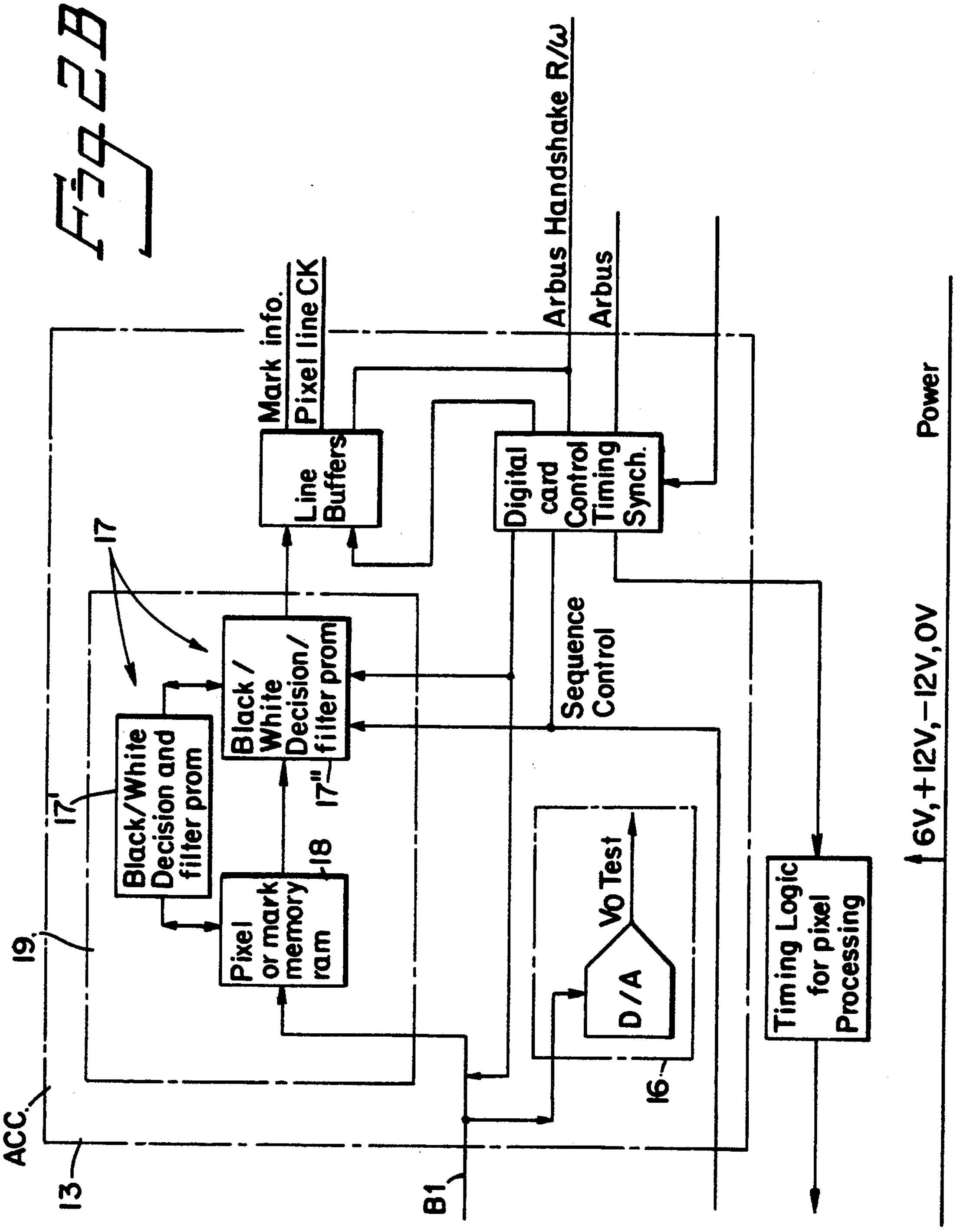

In the case of the embodiment illustrated in FIG. 2B, the logic unit 19 is incorporated in a RAM-type memory unit 18 and a PROM-type memory unit 17 which are intended for use in conjunction with a mark detection function 17' and a filtering function 17''.

Thus, the intensity indications generated during a mark detecting process, such indications including the aforesaid digitalized data flow are intended for comparison with pre-determined intensity values, the set-point values, and on the basis of said comparison light-intensity data is either attributed to the presence of a mark or to a non-mark.

The logic unit 17 is programmed to select light-intensity set-point values, whereby when deciding whether a certain light-intensity indication shall be attributed to the presence of a mark or a non-mark, there is used as a set-point value either the nearest preceding indication which has been judged as indicative of a non-mark and which, in the main, concerns light background of the paper web, or a preceding indication which has been judged as indicative of a non-mark and which has been subjected to a reduction in intensity of pre-determined magnitude.

The logic unit 17 is also programmed to attribute the intensity indication to a mark if said indication falls beneath the relevant set-point value by a pre-determined amount.

The logic unit 19 is also programmed so that when a selected, pre-determined reduction in light intensity is detected, the set-point value will be locked to the value on the basis of which said intensity reduction was established, and is retained as the set-point or control value until there is detected an intensity indication which corresponds to an intensity reduction which is smaller than said selected, pre-determined intensity reduction.

The aforesaid comparison are effected in the PROM-unit 17 in accordance with the following simple relationship.

| Comparison test | true | false |
|---|---|---|
| Relationship 1: V(new)j > (100-UP)%*V(old) j | V(OLD)j: = V(new)j (updating) | V(old)j unchanged |
| Relationship 2: V(new)j < (100-MK)%*V(old)j | mark | non-mark |
| Relationship 3: V(new)j < ABS | mark | non-mark |

where

V(new)j = the relevant intensity indication for one element j of said array 8 or the like.

V(old)j = the value corresponding to element j and read from table (RAM).

UP = the limit value at which locking of a set-point value takes place instead of updating.

MK = the limit value at which a mark is attributed to the intensity indication concerned.

ABS = the absolute limit value for attributing a light-intensity indication of the presence of a mark.

Figure 3:
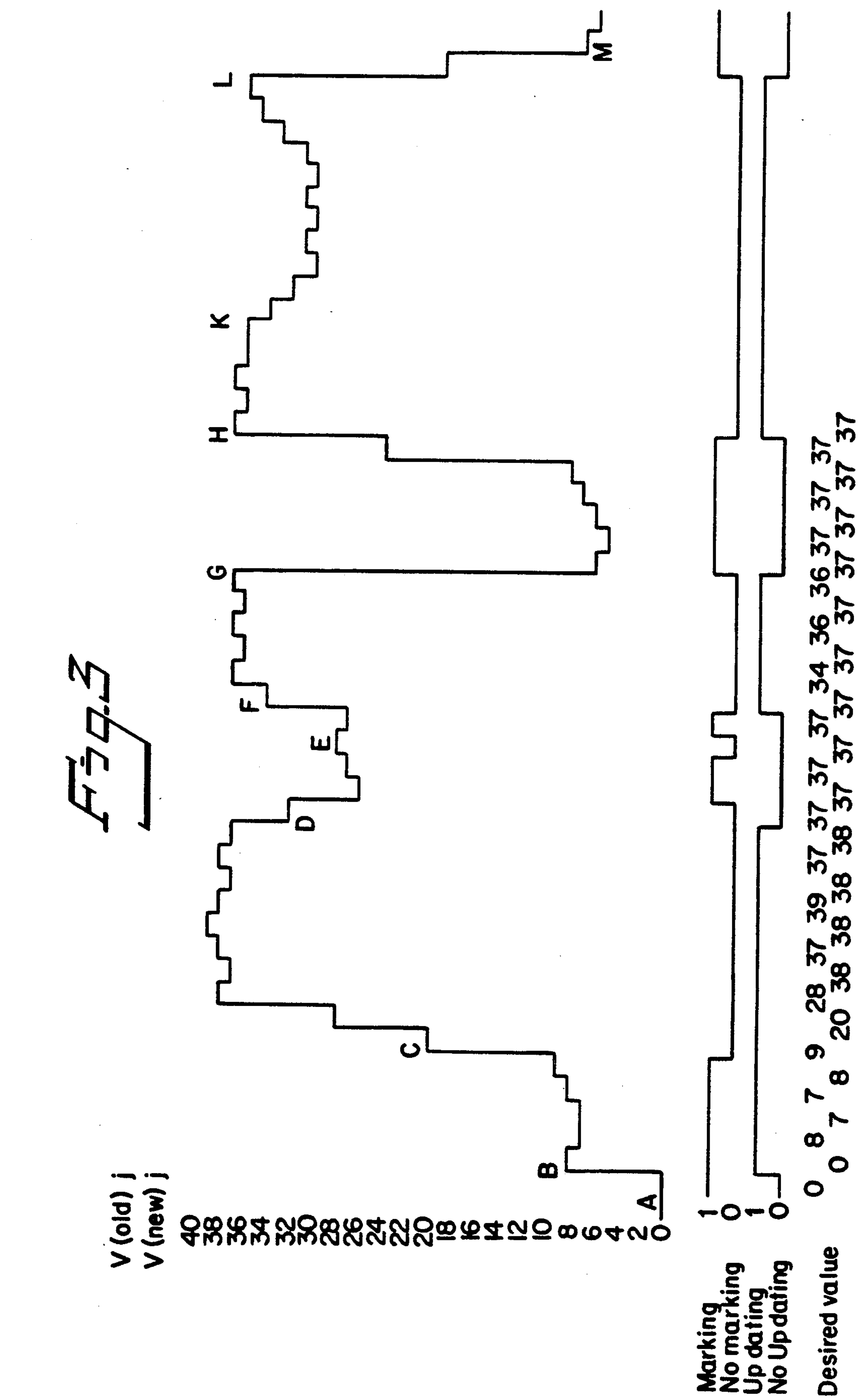
FIG. 3 illustrates schematically the performance of the mark detection process for one element of an inventive system, and shows by way of example the passage of a coupon which has hand-made marks, and OCR-print and a dirt stain thereon.

The action of an element during passage of a coupon 1 is thus shown schematically in FIG. 3.

The path along which the coupons are intended to move is, in itself, darkened and hence the light-intensity indications which arrive at the RAM-unit when no coupon, paper web, is located in the detecting station 4 will be considered to denote marks, and the set-point values applicable in this case are normally the latest non-mark intended light-intensity indications obtained from the immediately preceding coupon. It is not necessary to update the set-point values, and relationships 2 and 3 will apply in this case.

The RAM-unit 18 can be set to zero, by generating a flow of incoming intensity data set to zero, and feeding this data flow to the RAM-unit. The flow of incoming data is thus zero, as is also the corresponding space in the RAM-unit 18.

Shown at A to the left of FIG. 3 is the zero intensity corresponding to the aforesaid zero-flow, where the presence of a mark is recorded and no updating takes place.

Upon the termination of the zero-setting sequence, the light-intensity data incoming at B again indicates the dark background, whereupon the relationships 1 and 3 above apply, i.e. the set-point value is updated continuously and the presence of marks are recorded.

When the coupon 1, or paper web 1, reaches the detecting station, new and higher intensity indications are delivered to the RAM-unit at C, wherewith when the coupon or paper web consists of standard white paper, only the relationship 1 will apply. Non-marks are recorded.

When a mark or the like first appears on the coupon or paper web, it is possible that the detected reduction in light-intensity will suffice to stop updating of the set-point values, i.e. to lock the set-point value, as illustrated at position D in FIG. 3, but will not suffice to attribute the mark alternative to the intensity indication. The intensity reduction is thus greater than UP, but smaller than MK.

Since the value applicable when locking the set-point value was nominally white, the comparison made with subsequent intensity indications concerning said mark or the like will cause the intensity indications to be attributed to the presence of a mark, since the relationship 2 is fulfilled and the relationship 3 is also fulfilled. The set-point value locked at the beginning of the mark is applicable until the mark ceases to be present, has passed, and, at F, the paper web is again detected as being nominally white.

FIG. 3 also illustrates the performance of the same element when detecting a distinct, very dark mark, such as a black OCR digit. The relationship 2 applies in this case, and the locked set-point value is the intensity indication at G. When this mark ceases to be present, detection returns at H to conditions according to the fulfilled relationship 1, wherewith a nominally white coupon is detected during continuous updating of the set-point values.

FIG. 3 also illustrates the manner in which a slowly changing intensity level corresponding to white is detected by the lens 6 as a blurred print, with the beginning at K. The relationship 1 applies under these conditions, and a slowly-decreasing intensity level corresponding to white will be transmitted to the RAM-unit. This is not characteristic of OCR-print, but can occur when the lens is incorrectly focused or in the event of optical disturbances resulting, for instance, from dirty mirrors etc. The relationship 1 will apply during continuing updating and no marks will be detected.

At the end of the coupon, the intensity level is maintained at L corresponding to white with respect to the last paper part in the RAM-unit when the flow of intensity indications return at M to indicate the black background included by the path along which the coupons 1 or like documents are intended to be advanced.

Figure 6A:
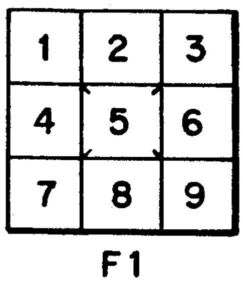
Figure 6B:
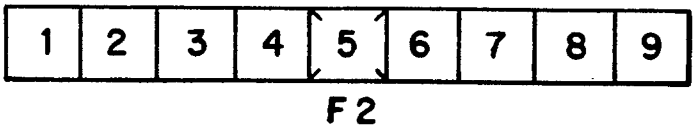

FIG. 6 illustrates both filter configurations, wherein F1 identifies a square arrangement of elements 1–9, of which the element 5 is the element under observation, and the reference F2 identifies a linear arrangement of elements 1–9, of which the element 5 is the element under observation. Filters of this kind represent a method of reducing the quantity of information in the reproduction or image obtained by the detecting process, or for cleansing said image. In the square filter F1 the observed element 5 is modified in accordance with the eight surrounding elements. In the case of the linear filter, modification is effected with respect to the four elements located upstream of and the four elements located downstream of one and the same sweep, the elements of the linear filter being disposed sequentially in the sweep direction, perpendicular to the plane of the paper.

Filter logic 17" is preferably included in the same PROM-unit 17 as the logic 17' for set-point selection, although the logic used in respective filters is separated in time. Both the linear and the square filter are used, by applying the logic state of the element concerning the address-input of the PROM-unit.

The performance of the filters can be programmed at different levels, and the truth tables of the filters are burned into the PROM-unit with the coefficients used in the logic for selection of set-point values.

Figure 5:
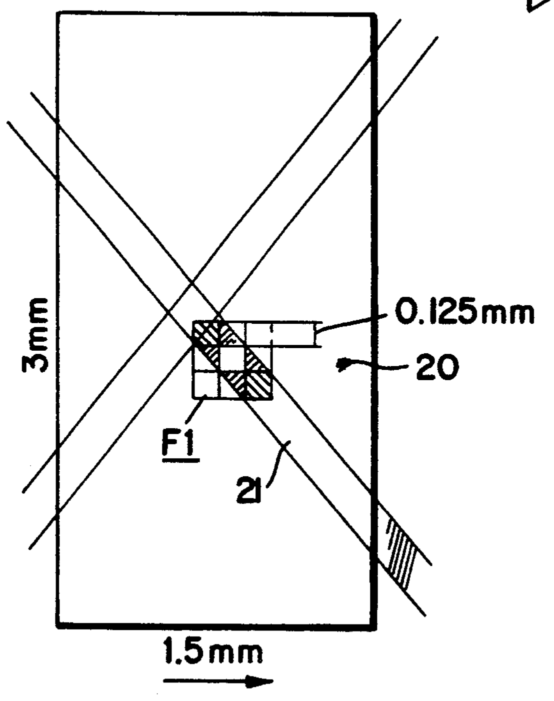
FIG. 5 illustrates schematically a mark and a disturbance factor in the form of a dirt stain, and also shows an imaginary or contemplated reading window, a square filter arrangement; and FIGS. *6a* and *6b* illustrate two element arrangements corresponding to a) a square filter and b) a linear filter.

FIG. 5 is intended primarily to illustrate the use of filters. With the embodiment illustrated in FIG. 5, it is possible to distinguish light intensity indications deriving from a dirt-spot, or blemish 20 on the paper web from the light-intensity indications relating to a mark 21, while taking into account the surrounding elements.

The modus operandi of the system according to the invention, and also the method according to the invention, will be apparent from the aforegoing.

Thus, the coupon 1 or corresponding paper web 1 is scanned, wherewith a series of light-intensity indications is obtained for each element in the array 8. These light-intensity indications are processed on the basis of the aforesaid relationships, so as to enable indications which relate to marks to be detected and recorded.

Register data based on scanned light-intensity indications is then entered into the RAM-memory unit. The data entering the memory unit 18 is compared continuously in the logic unit 11 with newly inserted data and previously registered data, in the aforedescribed manner, therewith classifying data into marks and non-marks and processing with the aid of an appropriate filter function, whereafter the resultant information relating to the marks present on the paper web is sent to a central control unit, in which the information is further processed so as to compile the desired comprehensive image of the coupon or the like. The following values have been used in the decision matrix illustrated in FIG. 4 with regard to set-point values, the attribution of marks/non-marks etc.:

ABS=max 10 in light intensity
UP=12%
MK=25%.

The matrix includes combinations of set-point values, real values and corresponding "regions" of the matrix, these combinations being referenced 0, 1, 2 and 3. The prevailing set-point value constitutes basic information when using the matrix, when the set-point value V(Old)j is the value with which each new light-intensity indication V(New)j is compared. For a given set-point value, such as 30, a "1" applies when the relationship 1 is true whereas neither relationship 2 nor the relationship 3 is true, i.e. the real value is greater than or equal to the set-point value or somewhat smaller than the set-point value, although not UP % or more less. The decision etc. taken in respect of a given set-point value with successively decreasing real values can thus be read horizontally from the matrix. For the same set-point value, such as 30, a "0" corresponds to the fact that the relationship 1 is false at the same time as the relationships 2 and 3 are also false. Updating of the set-point values ceases herewith, but no mark is registered. A "2" indicates that the real value is MK % or more less than the set-point value, the relationship 1 being false, the relationship 2 being true and the relationship 3 being false. As will be seen from the matrix shown in FIG. 4, in the case of the set-point value 30 a "1" applies for real values down to, and including, 27; a "0" applies for real values from and including 26 down to and including 23, and a "2" applies to real values from and including 22 and downwards. A "3" is allocated to combinations of set-point values and real values for which the relationship 1 and the relationship 3 apply.

It will be understood from the aforegoing that the method and apparatus according to the present invention afford splendid possibilities of eliminating the disturbing influence of components, such as age, deficiencies in the lens system, variation in the sensitivity of different parts of the array, etc. Thus, it is preferred that the elements of the optoelectronic devices 8 are each utilized per se, such that a given element is used to produce successive light-intensity indications corresponding to the light-intensity of regions lying in the direction of movement of the paper web. This eliminates substantially the effect of variations in the properties of the elements therebetween. Another important advantage afforded by the invention is that prevailing sensitivity in the form of the fixed relationships UP, MK and ABS renders the system independent of the absolute light-intensity and herewith of the paper.

It will be understood that the illustrated apparatus for carrying out the method according to the invention can be modified in several aspects. It is important, however, that colour filters (not shown) are placed in the close proximity of the document. When such colour filters are placed between the lamps 5 and the lens system 6, the filters will be located as close as possible to the lamps 5.

In the aforegoing, an exemplifying embodiment of the invention has been described with reference to the drawings. It will be understood, however, that other embodiments and minor modifications are conceivable, without departing from the concept of the invention.

For instance, the invention is not restricted for use in connection solely with betting coupons, such as pools coupons, but can also be applied, for instance, with bank notes and the like for identification, checking and like purposes.

Furthermore, other, essentially known methods can be used for producing a data flow suitable for identification of marks or the like.

I claim:

1. A method for detecting marks present on a paper web, comprising: the steps of transmitting an image of a paper web to an array of optoelectronic conversion elements located in a detecting plane and operative to produce video signals which correspond to the intensity of reflected light detected by respective conversion elements and emanating from an area of the paper web scanned by said element; said web and said elements being moved relative to each other during scanning; scanning areas of the paper web successively while successively producing light-intensity data in the form of intensity indications (Vj); attributing light-intensity data indications to the presence of one of a mark or a non-mark on the basis of a comparison made with predetermined light-intensity values, set-point values; attributing a mark to the light-intensity indication when said indication is smaller than the prevailing pre-determined set-point value by more than a pre-determined extent; and compiling from the thus classified light-intensity data a comprehensive image of marks present on the paper web, and when deciding whether a certain light-intensity indication shall be attributed to a mark using one of two kinds of produced light-intensity indications as a set-point value (V(old)j), the first being the nearest preceding light-intensity indication (V(old)j), in case the indication has been adjudged as indicative of a non-mark and essentially indicates light background of the paper web (1), and the second being a preceding indication (V(old)j), which has been adjudged as indicative of a non-mark and has been subjected to an intensity reduction of pre-determined magnitude (UP), respectively.

2. A method according to claim 1, wherein said elements are each used so that a given element produces successive light-intensity indications (Vj) corresponding to the light-intensity of regions lying in rows in the direction of movement of the paper web (1).

3. A method according to claim 1, wherein said sensed and produced light-intensity indications (Vj) are placed in direct relationship with prevailing set-point values, and in that increases and decreases in light-intensity indications are normalized on the basis of prevailing set-point values and given in, for instance, percent (%) of prevailing set-point values.

4. A method according to claim 1, wherein, upon detection of an intensity decrease of selected, pre-determined size (UP), the set-point value is locked to the value (Vj) on the basis of which said intensity decrease has been established, and is maintained at this value until an intensity indication is detected which corresponds to an intensity decrease which is smaller than said selected, pre-determined intensity decrease (UP).

5. A method according to claim 1, wherein said sensed and produced intensity indications (V(new)j) which lie beneath a given pre-determined, absolute level (ABS) are always attributed as indicating a mark.

6. A method according to claim 1, wherein processing of an intensity indication includes the steps of processing said intensity indication with the aid of one or more filters (F1,F2), comparing the indication with pre-determined peripheral indications, and carrying out an optional probability check.

7. Apparatus for detecting marks present on a paper web, comprising: means for transferring an image of the paper web to and including an array of optoelectronic conversion elements located in a detecting plane or the like and operative to produce video signals which correspond to the intensity of the light detected by a respective conversion element and emanating from an area of the paper web scanned by each said element of said array, including means for relatively moving said web and the detecting plane, whereby scanning of the paper web is carried out successively while successively producing light-intensity data in the form of light-intensity indications, and comprising further means for comparing said light-intensity indications with pre-determined light-intensity values, set-point values, and means for attributing light-intensity data to one of a mark or a non-mark on the basis of the comparison, and means (17') operative to attribute a mark to the scanned and produced light-intensity indication (V(new)j) when said indication falls below a prevailing set-point value (V(old)j) by a pre-determined extent (MK); and means for compiling the thus classified light-intensity data such as to form a comprehensive image of the subjects of the scan, and further including means (19) for selecting intensity-data set-point values (V(old)j) such that when deciding whether a certain scanned and produced light-intensity indication (V(new)j) shall be attributed as indicative of one of a mark and a non-mark, there is used one of two kinds of indications as a set-point value, a first set-point being the nearest preceding light-intensity indication, in case the indication was adjudged as indicative of a non-mark and, essentially concerns background light on the paper web (1), and a second set-point being a preceding indication, which has been adjudged as indicative of a non-mark and has been subjected to intensity decrease (UP) of pre-determined magnitude, respectively.

8. Apparatus according to claim 7, wherein each individual element of said array is operative to produce successive light-intensity indications (Vj) corresponding to the light-intensity of regions lying in a row in the movement direction of the paper web (1).

9. Apparatus according to claim 7, wherein set-point value selecting means (19) are provided and place light-intensity indications in direct relationship with prevailing set-point values, so that increases and decreases are intended to be normalized on the basis of prevailing set-point values and are given in percent (%) of the prevailing set-point value.

10. Apparatus according to claim 7, including means which detect an intensity decrease of selected, pre-determined value (UP) and render the set-point value selecting means (19) operative to lock the set-point value to the value on the basis of which said intensity decrease was established, and to maintain said locked in set-point value until there is detected a light-intensity indication which corresponds to a light-intensity decrease which is smaller than said previously selected, pre-determined light-intensity decrease (UP).

11. Apparatus according to claim 7, wherein said set-point value selecting means (19) includes means which provide that light-intensity indications which lie beneath a given predetermined, absolute level (ABS) are always attributed to a mark.

12. Apparatus according to claim 7, wherein one or more light filters (F1, F2) are provided and placed between the array of optoelectronic conversion elements and the light which is being sensed by said elements to provide a desired intensity indication, said desired intensity indication being intended for comparison with predetermined, peripheral indications and a probability check being carried out.

13. A method as defined in claim 1, including the further step of recording the successively produced light-intensity data.

14. Apparatus as defined in claim 7, further including means in said first named means which successively produces light-intensity data to enable recording of said produced light-intensity data.

* * * * *